UNITED STATES PATENT OFFICE.

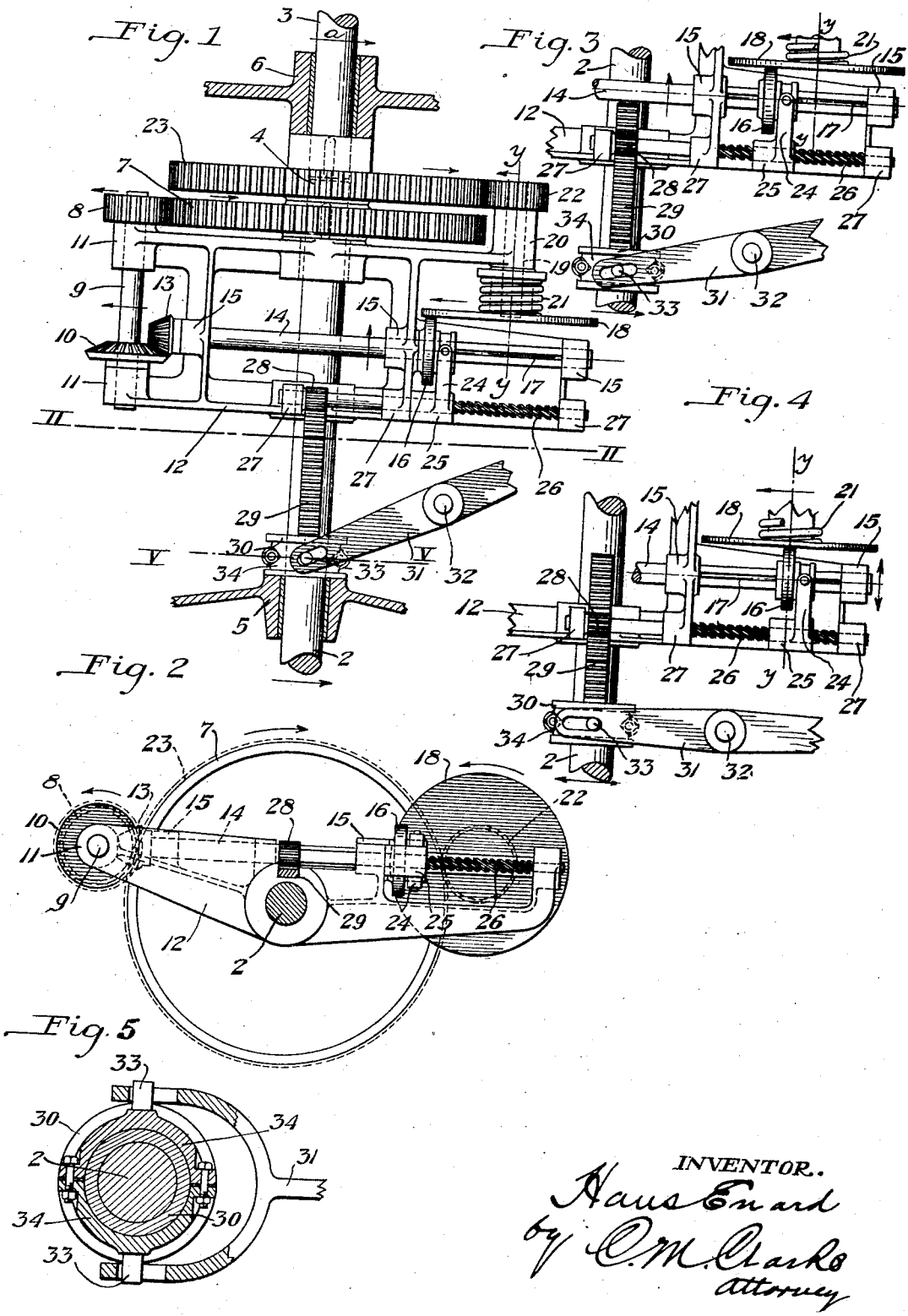

HANS ENARD, OF PITTSBURGH, PENNSYLVANIA.

POWER TRANSMISSION AND MECHANISM THEREFOR.

1,417,894.  Specification of Letters Patent.  Patented May 30, 1922.

Application filed July 21, 1921. Serial No. 486,350.

*To all whom it may concern:*

Be it known that I, HANS ENARD, a citizen of the United States, residing at Pittsburgh, in the county of Allegheny and State of Pennsylvania, have invented certain new and useful Improvements in Power Transmissions and Mechanism Therefor, of which the following is a specification.

My invention relates to improvements in variable speed power transmission and mechanism therefor. It has for its object to provide for varying the speed and proportionate transmission of power between a prime mover and a power utilizing element in a gradual, easy manner, and means for effecting the same through flexible or variable mechanism under the control of the operator.

Generally stated, the invention utilizes an engine shaft, a relatively independent driven shaft, and intervening gearing and a supporting frame therefor, embodying flexible means for varying the relationship between the driving and driven elements, in the manner more fully hereinafter set forth.

The invention is particularly adapted to the power equipment of a motor driven vehicle, and has in view to eliminate the usual clutch and transmission in common use, by maintaining between the engine shaft and the axle driving shaft, a continuously engaging variable high, low, and neutral, speed mechanism.

One typical embodiment of the invention is illustrated in the accompanying drawing, in which:

Fig. 1 is a plan view of the mechanism assembled, in high speed direct drive position;

Fig. 2 is a cross section on the line II—II of Fig. 1;

Fig. 3 is a partial view, similar to Fig. 1, showing the flexible transmission mechanism in a medium speed direct drive position;

Fig. 4 is a similar view in neutral position;

Fig. 5 is a section on the line V—V of Fig. 1.

In the drawings, 3 is the motor shaft of an internal combustion or other engine, normally revolving in the direction of the arrow *a* with a constant torque. The axle driving or power transmitting shaft 2 is in axial alinement with shaft 3, and the abutting ends of the shafts are preferably mounted for centralized bearing by extending one of them into the hub of the gear of the other, for journalled rotation, as indicated at 4, Fig. 1. Shaft 2 is supported in its usual bearings 5 and shaft 3 in bearings 6, suitably located for proper mounting support, as will be readily understood. Keyed to driven shaft 2 is a gear wheel 7 which is the initial transmitting gear from the power shaft.

Gear 7 is in mesh with pinion 8 of shaft 9 having the bevel gear 10 keyed to it, shaft 9 being journalled in bearings 11—11 of the rotatably mounted frame 12. Said frame is journalled on shaft 2 for free rotation thereon, more or less dependent upon the existing conditions. Bevel gear 10 is in mesh with bevel pinion 13 of shaft 14 journalled in bearings 15—15—15 of rotatable frame 12.

Shaft 14 is provided at its other end, between the intermediate and outermost bearings 15 with a friction disk and collar 16 in spline engagement with shaft 14 by keyway 17. Disk 16 is in peripheral frictional engagement with a driving disk plate 18 of shaft 19 journalled in bearing 20 of frame 12 and having a cushion spring 21 adapted to press the disk plate 18 into tight driving engagement with disk 16 at all times. The transmission through these elements is therefore flexible, i. e., capable of slippage under strain without disengagement.

At its other end, shaft 19 is provided with a driving pinion 22 which is in mesh with the driving gear 23 keyed by its hub to the end of driving shaft 3. As stated above, the hub of gear 23 is recessed sufficiently far to provide a journal bearing for the abutting end of driven shaft 2, whereby the relationship of these shafts is maintained. The collar of sliding disk 16 is adjusted longitudinally of spline shaft 14 by fork 24 of an adjusting nut 25 which is engaged by feed screw 26 of frame 12. Said screw shaft 26 is rotatably mounted in bearings 27—27—27 of frame 12, and is provided with a pinion 28 keyed or otherwise secured to the unthreaded portion of the shaft.

For the purpose of actuating pinion 28 and rotating threaded shaft 26 in one direction or the other, I provide a rack 29 slidably mounted in the hub of frame 12, extending backwardly and connected with an adjusting collar 30, which is loosely journalled on driven shaft 2. Said collar and the rack are actuated by an operating lever 31 pivotally mounted at 32 and having a pin and slot connection 33 with embracing shifting members 34 between the ends of the collar 30, the lever being connected with any suitable operating mechanism or provided with a terminal handle, as will be readily understood.

As thus constructed, the mechanism is capable of operation in transmitting power from shaft 3 through its keyed-on gear 23, pinion 22, disk 18, disk 16, bevels 13—10, shaft 9, pinion 8, gear 7, to shaft 2, at varying speeds, by setting the friction disk 16 at various distances from its center $y$—$y$, of shaft 20, and dependent upon the adjusted location of disk 16. Disk 18 transmits uniform movement through pinion 22, and gear 23 from driving shaft 3 to shaft 2, at various speeds, dependent upon such adjusted position of disk 16, during normal unvarying speed of shaft 3. At the middle position shown in Fig. 4, disk 16 is in neutral, and will transmit no movement whatever.

It will be observed the entire variable speed transmitting mechanism, except gears 7 and 23, is mounted upon and carried by the frame 12. As indicated by the arrows, the pinions 8 and 22 each rotate in the same direction, gear 7 being actuated by power of pinion 8 and pinion 22 being the driven element from gear 23. There is thus provided, at substantially opposite sides of the driving gear 23 and driven gear 7, the pinions 22 and 8, the effective action of which is to tend to balance and maintain an equilibrium in the mechanism itself, so as to avoid or largely overcome any tendency to exert a whirling motion to frame 12.

That is to say, assuming shaft 2 to be under load, the transmission of power from shaft 3 through the gearing, at whatever position disk 16 may assume with relation to disk 18, will be under normal condition of balance, and at the same time under complete control of the operator as to the desirable variation in position of the speed and power controlling disk 16.

In this manner, disk 16 may be gradually adjusted toward or from the center of disk 18 within the sensitive control of the operator, dependent upon the load, or grade, condition of the road, or other contingencies arising in the operation of motor vehicles, and the shifting can be done, after a little practice, with such ease and certainty as to completely effect a substantially average power to the driven shaft at all times with, of course, a gradual varying speed.

The mechanism itself, in the form illustrated and above described, is comparatively simple, and mechanically operative. It will be understood, of course, that various substitutions and modifications of detail parts may be made by the skilled mechanic, or that various other adaptations of the invention may be introduced, but all such changes are to be understood as within the scope of the following claims.

I claim:

1. Power transmitting mechanism comprising a driving gear, a driven gear in axial alinement therewith, oppositely arranged balancing pinions in mesh with each of said gears respectively, and gearing embodying variable transmitting mechanism connecting said pinions.

2. Power transmitting mechanism comprising a driving gear, a driven gear in axial alinement therewith, oppositely arranged balancing pinions in mesh with each of said gears respectively, and intervening gearing embodying variable transmitting mechanism connecting said pinions arranged to swing around the axial center of said gears, and means for adjusting the same.

3. Power transmitting mechanism comprising a driving gear, a driven gear in axial alinement therewith, oppositely arranged balancing pinions in mesh with each of said gears respectively, and gearing embodying a driving friction member and a relatively adjustable driven friction member in engagement therewith connecting said pinions and means for adjusting the same.

4. Power transmitting mechanism comprising a driving gear, a driven gear in axial alinement therewith, oppositely arranged balancing pinions in mesh with each of said gears respectively, and intervening gearing connecting said pinions embodying a driving friction member, a relatively adjustable driven friction member in engagement therewith, a freely swinging supporting frame therefor, and means for adjusting the driven friction member.

5. In power transmitting mechanism, a driving gear, a driven gear, and a rotatable supporting frame carrying gears intermeshing with each of said gears and embodying variable transmitting mechanism intervening between and connecting said intermeshing gears, and means for adjusting the same.

6. In power transmitting mechanism, a driving gear, a driven gear and shaft in axial alinement therewith, a supporting frame rotatably mounted on said shaft carrying gears intermeshing with each of said gears and embodying flexible variable transmitting mechanism intervening between and connecting said intermeshing gears, and means incorporated therewith for adjusting the same.

In testimony whereof I hereunto affix my signature.

HANS ENARD.